(12) United States Patent
Lee et al.

(10) Patent No.: US 10,605,962 B2
(45) Date of Patent: Mar. 31, 2020

(54) IMAGING DEVICE USING PLURALITY OF LENSES

(71) Applicant: GWANGJU INSTITUTE OF SCIENCE AND TECHNOLOGY, Buk-gu, Gwangju (KR)

(72) Inventors: Heung No Lee, Gwangju (KR); Woong Bi Lee, Gwangju (KR); Hwan Chol Jang, Gwangju (KR)

(73) Assignee: GWANGJU INSTITUTE OF SCIENCE AND TECHNOLOGY, Buk-gu Gwangju (KR)

( * ) Notice: Subject to any disclaimer, the term of this patent is extended or adjusted under 35 U.S.C. 154(b) by 0 days.

(21) Appl. No.: 15/761,855

(22) PCT Filed: Sep. 21, 2016

(86) PCT No.: PCT/KR2016/010547
§ 371 (c)(1),
(2) Date: Mar. 21, 2018

(87) PCT Pub. No.: WO2017/052203
PCT Pub. Date: Mar. 30, 2017

(65) Prior Publication Data
US 2018/0267213 A1    Sep. 20, 2018

(30) Foreign Application Priority Data

Sep. 21, 2015   (KR) .................. 10-2015-0132810

(51) Int. Cl.
*G02B 3/00*   (2006.01)
*G01J 1/44*   (2006.01)
(Continued)

(52) U.S. Cl.
CPC .......... *G02B 3/0037* (2013.01); *G01J 1/0411* (2013.01); *G01J 1/44* (2013.01);
(Continued)

(58) Field of Classification Search
CPC ............... G02B 3/0037; G02B 13/006; H04N 5/23238; H04N 5/2258; H04N 5/23235;
(Continued)

(56) References Cited

U.S. PATENT DOCUMENTS 10,250,871 B2 *   4/2019   Ciurea .................. H04N 5/247
2012/0106889 A1   5/2012   Jung et al.
(Continued)

FOREIGN PATENT DOCUMENTS

JP   H08307907 A   11/1996
JP   2006048659 A   2/2006
(Continued)

OTHER PUBLICATIONS

Espacenet, English Machine Translation for Japanese Patent Publication No. 2006048659A, 94 pages.
(Continued)

*Primary Examiner* — Gevell V Selby
(74) *Attorney, Agent, or Firm* — Brooks Kushman P.C.

(57) ABSTRACT

An imaging device using a plurality of lenses according to the present disclosure includes: a compound eye through which a detected image is obtained by a plurality of lenses; a measurement matrix storage unit in which at least one measurement matrix is stored; and an image recovery unit configured to recover an image from the detected image using a digital signal processing technique using sparse representation using the measurement matrix. According to the present disclosure, an imaging device may be obtained which may improve the resolution of an image even while a wide undistorted FOV, an infinite depth, and fast motion recognition, which may be obtained using compound eyes, are achieved. Accordingly, discrimination of an object by the compound eyes may be improved, so that a human having
(Continued)

camera-type eyes may acquire image information while advantages of the compound eyes are maximized.

3 Claims, 11 Drawing Sheets

(51) Int. Cl.
*H04N 5/225* (2006.01)
*G02B 13/00* (2006.01)
*H04N 5/232* (2006.01)
*G01J 1/04* (2006.01)

(52) U.S. Cl.
CPC ........... *G02B 13/006* (2013.01); *H04N 5/225* (2013.01); *H04N 5/2254* (2013.01); *H04N 5/2258* (2013.01); *H04N 5/23235* (2013.01); *H04N 5/23238* (2013.01)

(58) Field of Classification Search
CPC ..... H04N 5/2254; H04N 5/225; G01J 1/0411; G01J 1/44
See application file for complete search history.

(56) References Cited

U.S. PATENT DOCUMENTS

| | | | |
|---|---|---|---|
| 2013/0037698 A1* | 2/2013 | Maeda | H01L 27/14627 250/208.1 |
| 2014/0240532 A1* | 8/2014 | Marwah | H04N 5/2621 348/222.1 |
| 2016/0241840 A1* | 8/2016 | Kim | H04N 5/2254 |
| 2018/0041673 A1* | 2/2018 | Lee | H04N 5/23293 |

FOREIGN PATENT DOCUMENTS

| | | |
|---|---|---|
| KR | 20120045516 A | 5/2012 |
| KR | 101427854 B1 | 8/2014 |

OTHER PUBLICATIONS

Espacenet, English Machine Translation for Japanese Patent Publication No. H08307907A, 12 pages.

Espacenet, English Machine Translation for Korean Patent Publication No. 101427854B1, 11 pages.

Korean Patent Office acting as International Search Authority, International Search Report issued for corresponding International Application No. PCT/KR2016/010547, dated Dec. 27, 2016, 3 pages.

Lee et al., COMPO-EYE: A High Resolution Computational Compound Eye, Optics Express, 2016, pp. 2013-2026, vol. 24, Iss. 3, The Optical Society of America: OSA Publishing, 17 pages.

Song et al., Research on Optical Devices and Optical Imaging Systems Inspired by the Structure of an Insect's Eye, Physics and High Technology, pp. 25-30, 22.25. 10.3938/PhiT.22.040, 6 pages.

\* cited by examiner

IMAGING DEVICE USING PLURALITY OF LENSES

CROSS-REFERENCE TO RELATED APPLICATIONS

This application is the U.S. national phase of PCT Application No. PCT/KR2016/010547 filed on Sep. 21, 2016, which claims priority to Korean Patent Application No. KR 10-2015-0132810 filed on Sep. 21, 2015, the disclosures of which are incorporated in their entirety by reference herein.

TECHNICAL FIELD

The present disclosure relates to an imaging device, and more particularly, to an imaging device using a plurality of lenses.

BACKGROUND ART

Compound eyes, which are typically exemplified as insect's eyes, are provided by arranging a plurality of stemmata in a three-dimensional curved surface.

The compound eyes have features such as a wide field of view (FOV), an infinite depth, and fast motion recognition. Thus, the compound eyes act as one factor that increases survival opportunities of insects from enemies. Due to such features, the compound eyes are expected to be applied to a surveillance camera of micro aviation equipment, fast motion detection, image-guided surgery, surgical equipment, and the like.

For various advantages of the compound eyes, a user may refer to electronic eyes introduced on pages 64 of the July issue of 2013 of the Monthly science and technology published by the Korean Federation of Science and Technology. According to the above-described document, a method of manufacturing artificial compound eyes imitating insect's eyes has been introduced. According to the document, it can be identified that insect's eyes may be manufactured. However, it was not mentioned how to process light input through respective stemmata provided in the compound eyes. For example, a quantity of light input to each stemma corresponds to any one pixel of the entire image.

According to the document, since an image is processed while the light input through the stemma is recognized as a single pixel, when the number of lenses corresponding to the respective stemmata does not increase, a high-resolution image cannot be obtained. Further, it is difficult to increase the number of the lenses infinitely by a degree to which the resolution of an image may increase in a narrow space.

DISCLOSURE

Technical Problem

The present disclosure is proposed under the above background, and an aspect of the present disclosure is to provide an imaging device using a plurality of lenses, which may increase the resolution of an image even while maximizing advantages of compound eyes.

Technical Solution

An imaging device using a plurality of lenses according to the present disclosure may include a compound eye through which a detected image is obtained by a plurality of lenses, a measurement matrix storage unit in which at least one measurement matrix is stored, and an image recovery unit configured to recover an image from the detected image using a digital signal processing technique using sparse representation using the measurement matrix.

An imaging device using a plurality of lenses according to another aspect of the present disclosure may include at least several tens of lenses arranged such that an angle between the lenses is smaller than an acceptance angle of the lenses, at least several tens of photosensors configured to measure a quantity of light input to correspond to the several tens of lenses, respectively, a measurement matrix storage unit in which at least one measurement matrix is stored, and an image recovery unit configured to acquire a recovered image by using an equation, $$\hat{s} = \underset{s}{\operatorname{argmin}} \|S\|_1 \quad \text{subject to} \quad \|y - A\Psi s\|_2^2 \leq \varepsilon,$$

wherein y denotes information on pixels measured by the at least several tens of photosensors, A denotes the measurement matrix, x denotes information on pixels of the recovered image, $x = \Psi s$ is satisfied when x denotes information on the pixels of the recovered image, $\Psi$ is a sparsifying basis by which the information x on a light quantity of a pixel of the recovered image is estimated to have a small number of nonzero elements s, and $\varepsilon$ is a threshold.

Advantageous Effect

According to the present disclosure, an imaging device may be obtained which may increase the resolution of an image even while achieving features of a wide FOV, an infinite depth, and fast motion recognition, which may be obtained by using a structure of compound eyes. Accordingly, since a discrimination of an object by the compound eyes may increase, a human having camera-type eyes may acquire image information while advantages of the compound eyes are maximized.

BRIEF DESCRIPTION OF DRAWINGS

12 is a view illustrating a recovered image obtained by performing the digital signal processing while the acceptance angle is 60 degrees, which is approximately 27 times larger than the angle between lenses, according to the embodiments.

MODE FOR INVENTION

Hereinafter, detailed embodiments of the present disclosure will be described in detail with reference to the accompanying drawings. However, the spirit of the present disclosure is not limited to the following embodiments, and those skilled in the art who understands the spirit of the present disclosure may easily propose other embodiments included in the same scope of the spirit by adding, changing, and deleting components. Further, it can be understood that the other embodiments are included in the scope of the spirit of the present disclosure. Also, the accompanying drawings are focused on understanding the spirit of the present disclosure, and the size, the direction, the shape, and the like thereof may be different from those of actual implementation. Also, with regard to mathematical processing and an algorithm which are necessary for understanding the present disclosure but are already widely known to those skilled in the art, introduction of the technology is presented, the entire contents thereof are considered to be included in the specification of the present disclosure, and detailed description thereof will be omitted. Also, a technology named the related art in the following description refers to a technology introduced in the non-patent document, and is introduced to clarify description compared to the present disclosure.

Figure 1:
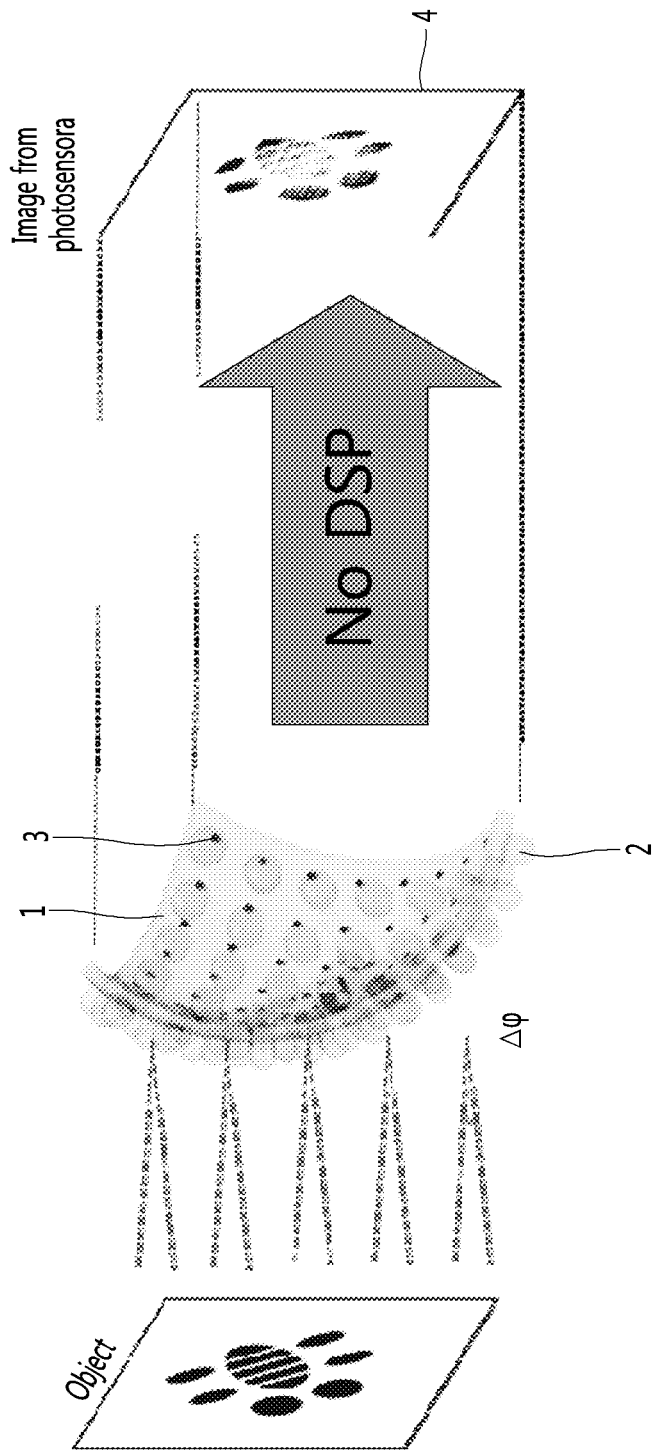
FIGS. 1 and 2 are views for explaining a simple configuration of an imaging device using a plurality of lenses in comparison between the related art and embodiments of the present disclosure.
Figure 2:
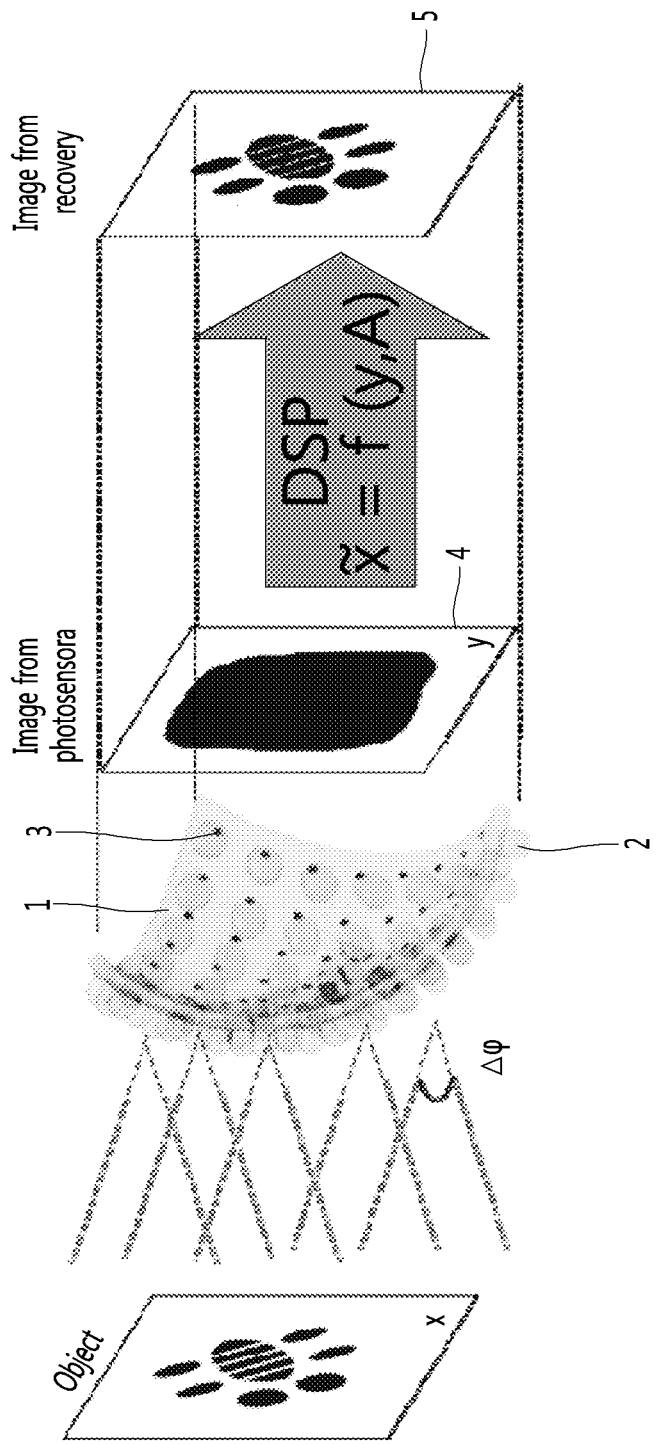

FIGS. 1 and 2 are views for explaining a simple configuration of an imaging device using a plurality of lenses in comparison between the related art and embodiments of the present disclosure.

Referring to FIG. 1, an image of an object is input to a plurality of lenses 2 supported on a curved surface 1. Respective lenses included in the plurality of lenses 2 face a specific area in a three-dimensional space. The specific area is, thereafter, referred to as a viewing area corresponding to the lenses. When an object exists in the viewing angle, a lens corresponding to the object existing in the viewing area may perform acceptance in the form of a change in a light quantity. A single photosensor 3 may correspond to each of the plurality of lenses 2. The photosensor 3 may recognize the light quantity. Although the photosensor 3 may recognize the light quantity, two-dimensional distribution of the light quantity may not be recognized using any one photosensor. The photosensor 3 corresponds to a single pixel on an image to provide a detected image 4. The curved surface 1 may be provided in a one-dimensional, two-dimensional, or three-dimensional curved surface.

The detected image 4 may provide pixels corresponding to the number of the lenses 2. Thus, when the number of the lenses 2 is large, the detected image 4 having a high resolution may be obtained, and when the number of the lenses 2 is small, only the detected image 4 having a small resolution may be obtained. However, it is difficult to increase the number of the lenses 2 infinitely. One reason for this is that it is difficult to arrange, on the curved surface 1, a micro electronic element and a micro optical element, particularly, the lenses 2, smoothness of an outer surface of which is important.

In an imaging device according to an embodiment of the present disclosure, which is contrary to this, photosensors 3 perform recognition through lenses 2 in the form of a light quantity. Meanwhile, in the embodiment, an acceptance angle of the lenses 2 is significantly larger than an angle between the lenses 2. Thus, in the detected image 4 detected through the respective photosensors 3, since large parts of pixels overlap with each other, an image which a human may recognize substantially may not be obtained. However, in the embodiment, the detected image 4 may obtain a recovered image 5 through digital signal processing (DSP), and the recovered image 5 may have a resolution that is remarkably higher than that of the detected image 4 according to the related art.

Figure 3:
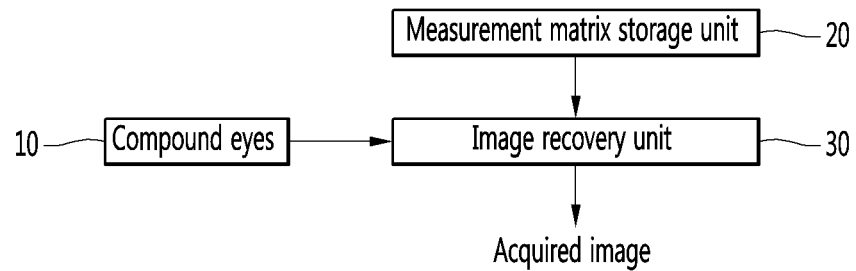
FIG. 3 is a block diagram illustrating a configuration of an imaging device using a plurality of lenses according to an embodiment.

FIG. 3 is a block diagram illustrating a configuration of an imaging device using a plurality of lenses according to an embodiment.

Referring to FIG. 3, the detected image 4 may be recognized through compound eyes 10, and the detected image 4 may be recovered through an image recovery unit 30. The image recovery unit 30 uses measurement matrixes when recovering an image. Here, the compound eyes 10 are referred to as a configuration including the lenses 2, the curved surface 1, and the photosensor 3, which are illustrated in FIG. 2. The measurement matrixes may previously be provided in plurality, and may be stored in a measurement matrix storage unit 20. The plurality of measurement matrixes may be stored according to a distance between the lenses 2 and the object. This is because a space which the lenses 2 face corresponds to a three-dimensional space, the lenses 2 face different directions, and thus, actually, the viewing area detected in two dimensions changes according to a distance between the object and the lenses 2. In other words, this is because the shape and the size of the viewing area changes according to the distance between the object and the lenses 2.

Meanwhile, in the embodiment, the acceptance angle of the lenses 2 is significantly larger than the angle between the lenses 2. Thus, in the detected image 4 detected through the respective photosensors 3, the large parts of the pixels overlap with each other. Therefore, unlike the related art, a point situated at a specific location may be detected redundantly by the plurality of lenses 2 and the photosensors 3.

The measurement matrixes stored in the measurement matrix storage unit 20 may be provided by placing various objects at a certain distance in front of the lenses 2 and actually specifying the objects. For example, when a sheet of white paper is placed at any small point, a dot is marked at a specific point of the white paper, and the white paper is observed through compound eyes according to the embodiment, an object may be placed in the viewing area which the plurality of lenses 2 may view. While the dot is situated at various locations, one complete measurement matrix may be obtained. This means that a dot at any specific point is detected as a complex light quantity through the plurality of lenses 2 so that more information may be provided. A clearer image may be recovered by analyzing the more information in a compressive sensing method. The compressive sensing method is one kind of the DSP, and an image may be recovered through yet another DSP technique. However, in the case of the embodiment, the image may be recovered more accurately and clearly by using the compressive sensing method. The same will be applied to the following.

Effects of the imaging device using a plurality of lenses according to the embodiment will be described below in detail.

Figure 4:
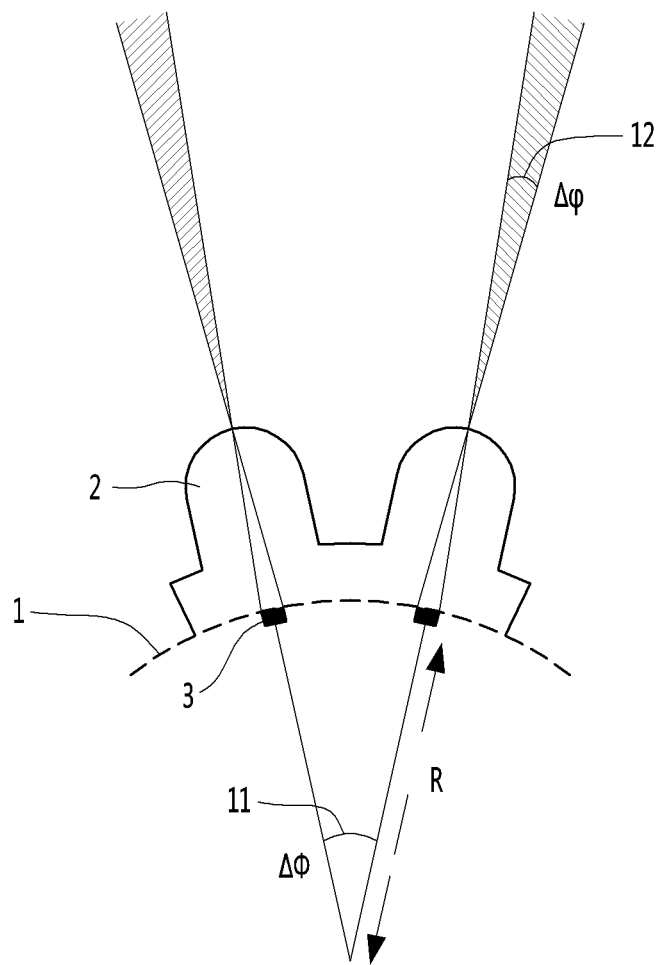
FIGS. 4 and 5 are views for explaining an acceptance angle and an angle between lenses in the imaging device using a plurality of lenses in comparison between the related art and the embodiments of the present disclosure.
Figure 5:
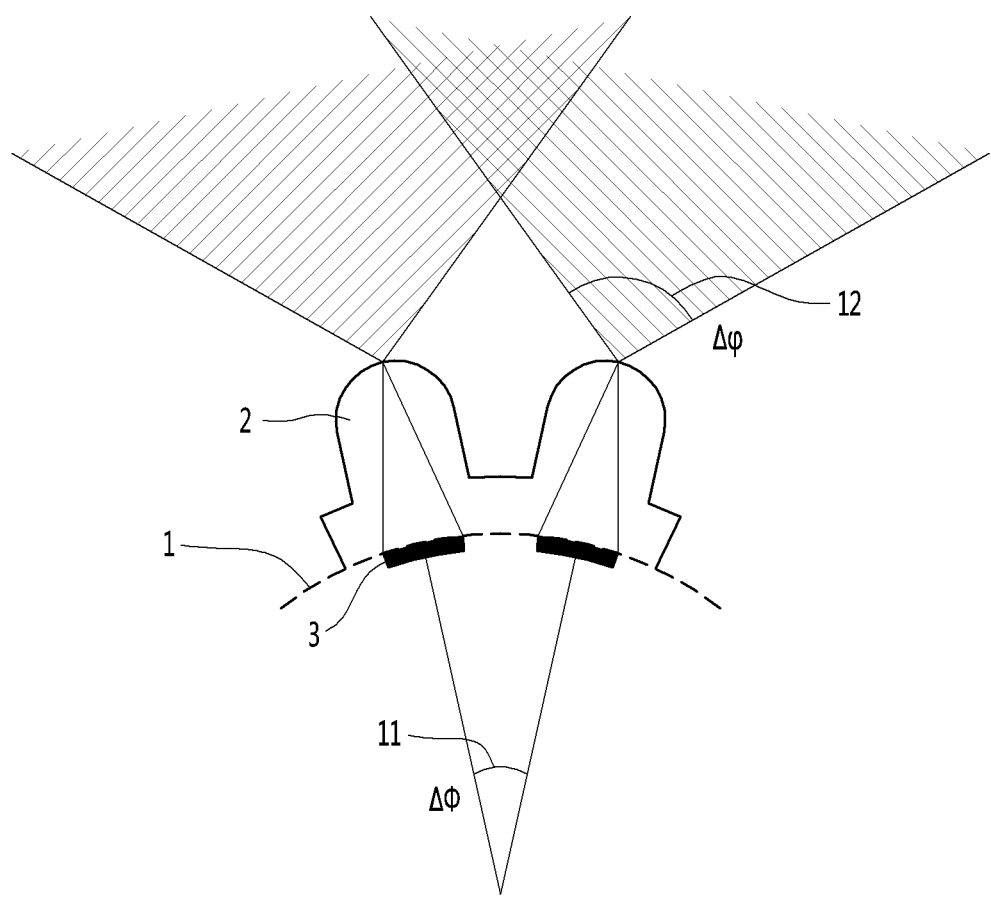

FIGS. 4 and 5 are views for explaining an acceptance angle and an angle between lenses in the imaging device using a plurality of lenses in comparison between the related art and the embodiments of the present disclosure.

FIG. 4 illustrates the related art. Referring to FIG. 4, when an angle 11 between the lenses 2 denotes ΔΦ, and the acceptance angle 12 of the lenses 2 denotes Δφ, a relationship of ΔΦ≥Δφ is achieved, and thus the angle 11 between the lenses is equal to or larger than the acceptance angle 12 of the lenses. In other words, viewing information input through any one lens 2 does not overlap with or minimally overlaps with information on a viewing area input through another lens 2. This is because information on viewing areas input through different lenses 2 serves to increase noise interference in the detected image 4, and thus is not preferable. Of course, in the general nature world, there are other cases according to habitat environments of animals and insects. For example, in the case of calliphora, an acceptance angle of a stemma is 1.5 degrees, and an angle between stemmata is 1.02 degrees.

FIG. 5 illustrates the embodiment. Referring to FIG. 5, contrary to FIG. 4, when the angle 11 between the lenses 2 denotes ΔΦ, and the acceptance angle 12 of the lenses 2 denotes Δφ, a relationship of ΔΦ<<Δφ is achieved, and thus the angle ΔΦ between the lenses is much smaller than the acceptance angle Δφ of the lenses. In other words, information on a viewing area input through any one lens 2 largely overlaps with information on a viewing area input through another lens 2. For example, although depending on the distance between the lenses and the object, any one point may be input to several tens of the lenses together. This is because information on viewing areas input through different lenses 2 not only serves to increase interference in the detected image 4, but also serves to more accurately identify a point at a certain location by analyzing the interference. The analysis may be performed since which lens a point at a certain location at a specific distance is input through may be identified by the measurement matrixes.

Figure 6:
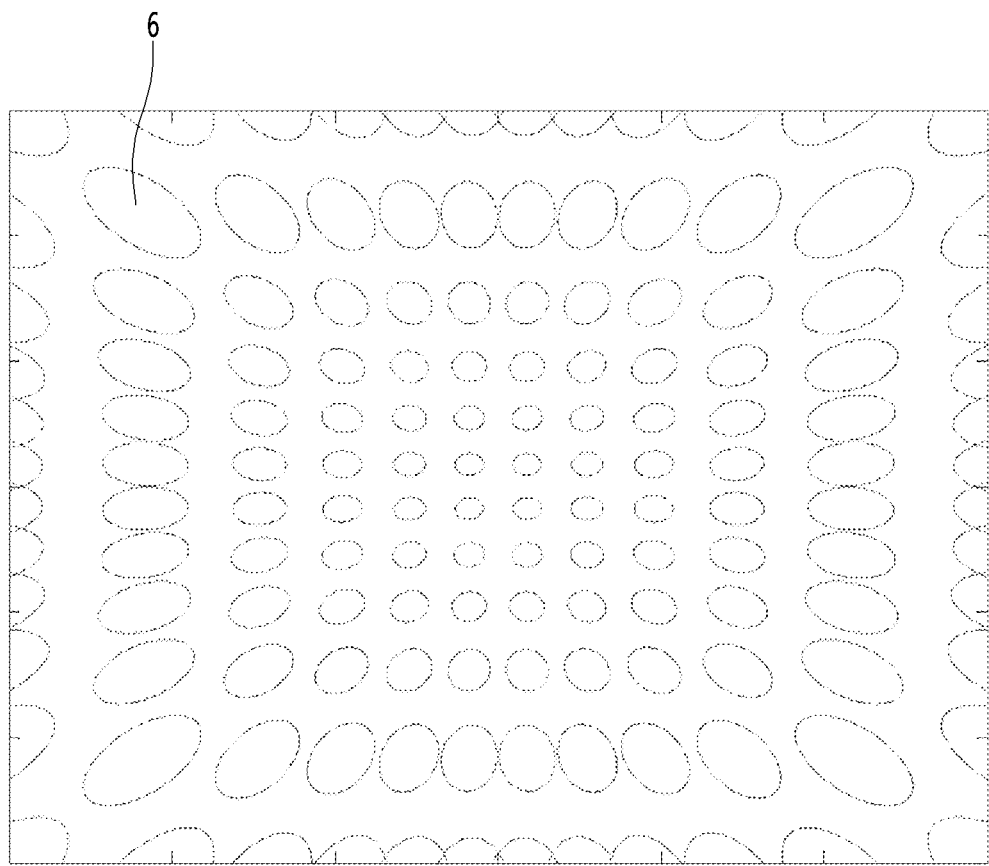
FIGS. 6 and 7 are views for explaining a viewing area in the imaging device using a plurality of lenses in comparison between the related art and the embodiments of the present disclosure.
Figure 7:
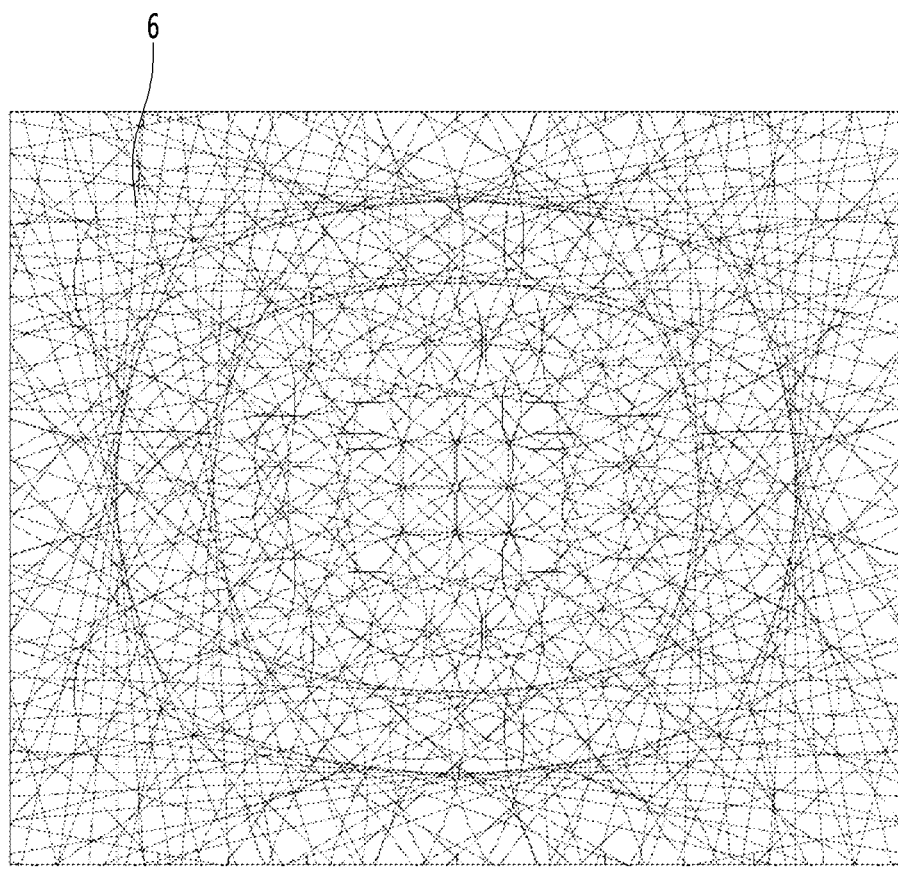

FIGS. 6 and 7 are views for explaining a viewing area in the imaging device using a plurality of lenses in comparison between the related art and the embodiments of the present disclosure. As already described, the viewing area indicates a two-dimensional area input through any one lens 2.

FIG. 6 illustrates a viewing area according to the related art. Referring to FIG. 6, a viewing area 6 corresponding to any one lens, a part of the viewing area 6 at a central portion on arrangement of the plurality of lenses 2 is narrow, and the viewing area 6 is widened as it goes outward. This is because the arrangement of the lenses has such a form, and although a point which the lenses face is arranged in three dimensions, the viewing area is arranged in two dimensions.

FIG. 7 illustrates a viewing area according to the embodiment. Referring to FIG. 7, the viewing area 6 corresponding to any one lens at the central portion on the arrangement of the plurality of lenses 2 is narrow and the viewing area 6 is widened as it goes outward, which is like the related art. However, the size of any one viewing area 6 is significantly large as compared to the related art. Thus, a specific point may be simultaneously included in the viewing area 6 corresponding to largely several tens of lenses 2.

Figure 8:
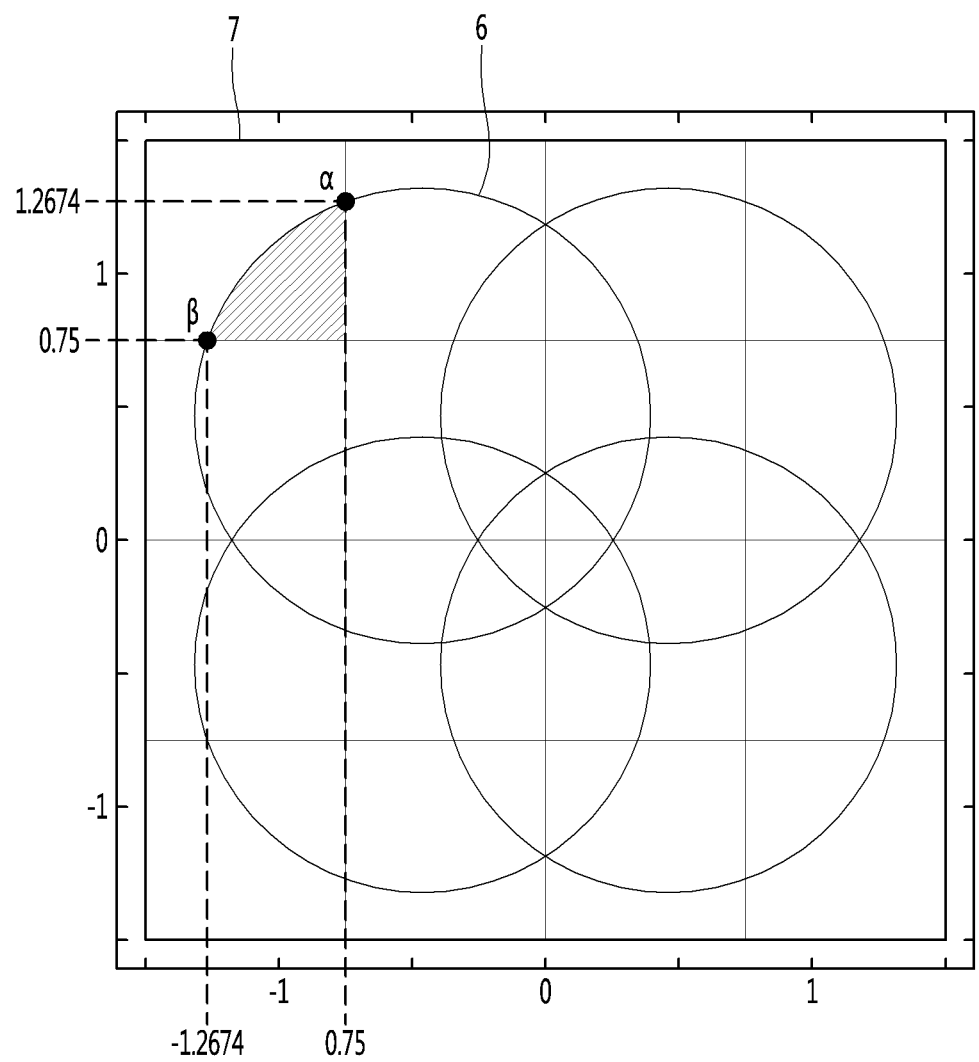
FIG. 8 is a view for explaining a relationship between the viewing area and a pixel.

FIG. 8 is a view for explaining a relationship between the viewing area and a pixel.

Referring to FIG. 8, the viewing area 6 of any one lens 2 is exemplified as a circle, and each pixel 7 is illustrated as a quadrangle. Since all four viewing areas 6 are included in four pixels 7 at the center, information may be acquired from four lenses. Unlike this, since a pixel at an outermost edge corresponds only to any one viewing area, information may be acquired only from one lens. Here, the pixel may be a pixel of the detected image 4.

An interrelation between the viewing area and the pixel provided in FIG. 8 is illustrated when the viewing area has a circular shape. Since the viewing area actually has various aspects and shapes according to arrangement and the number of lenses, the viewing area and the pixel may have a more complex interrelation.

Figure 9:
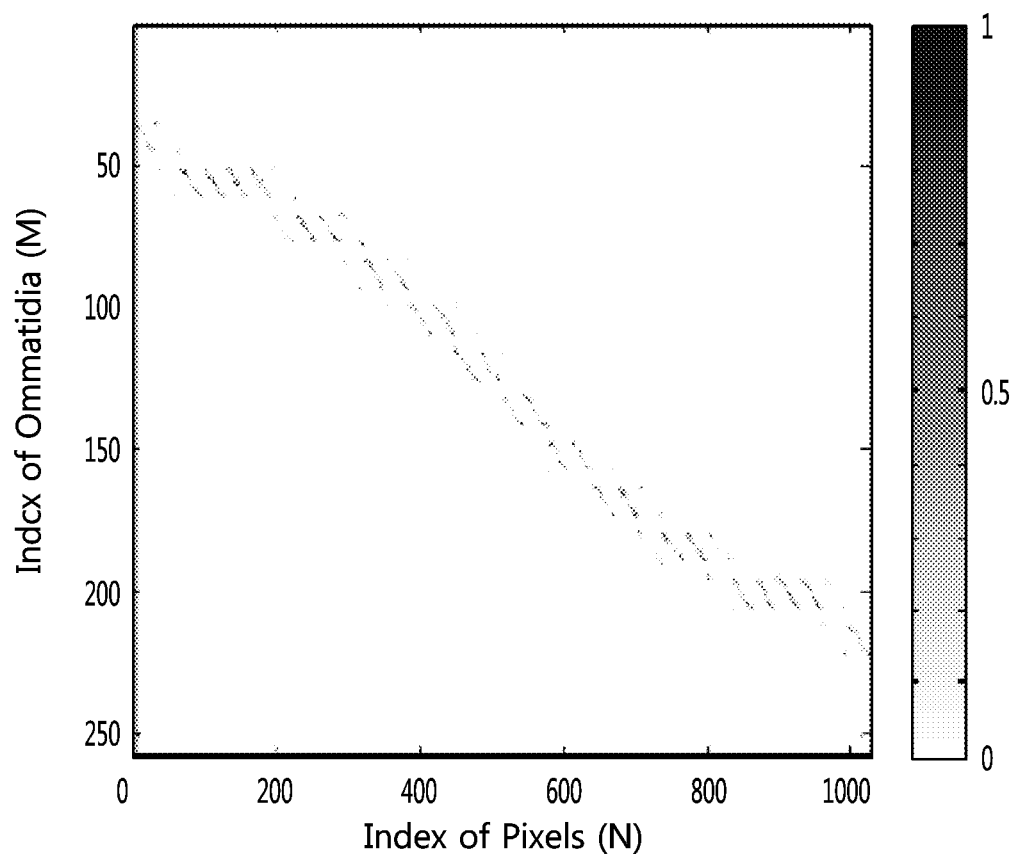
FIGS. 9 and 10 are views for explaining a measurement matrix obtained by the imaging device using a plurality of lenses in comparison between the related art and the embodiments.
Figure 10:
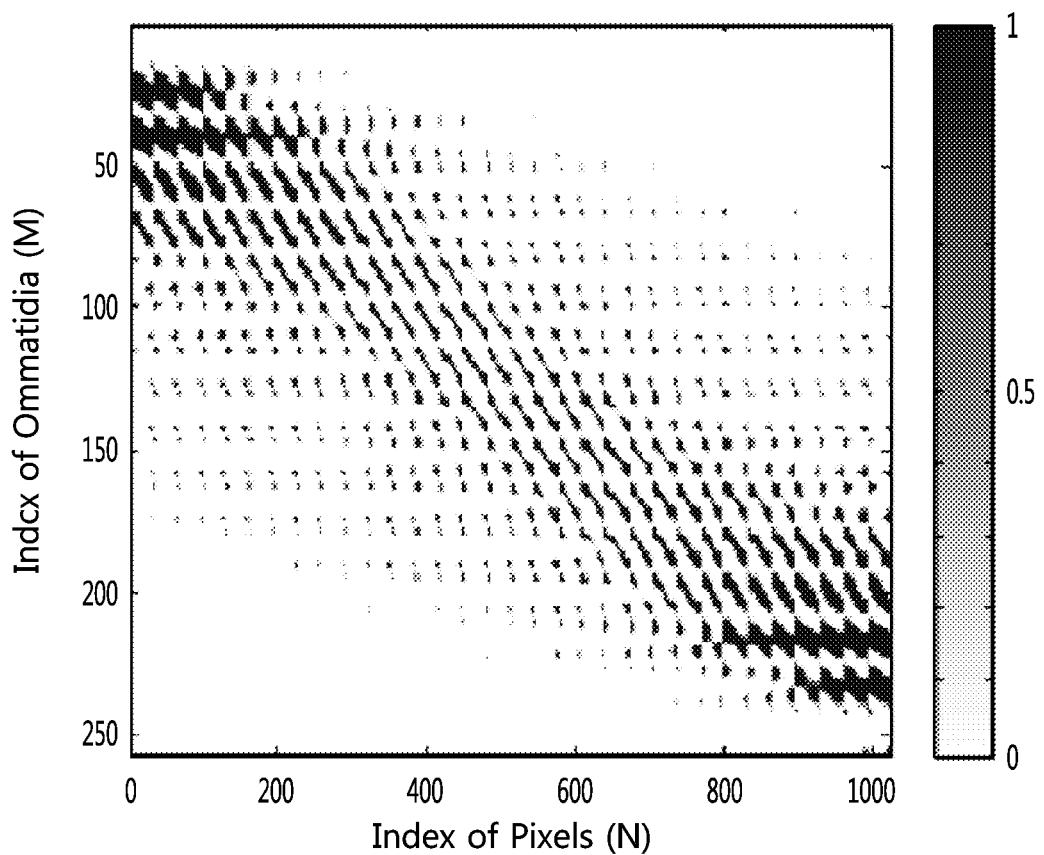

FIGS. 9 and 10 are views for explaining a measurement matrix obtained by the imaging device using a plurality of lenses in comparison between the related art and the embodiments. Here, the measurement matrix is obtained using the same object in a state in which distances between lenses and the object are equal to each other.

In the case of an embodiment of FIG. 10, it can be identified that more nonzero elements exist in the measurement matrix, as compared to the related art of FIG. 9. In FIG. 10, a specific column indicates from which lens information is input to any one pixel, and a specific row indicates to which pixel information is input from any one lens. The measurement matrix may be defined as a measurement matrix for a point on a flat plane in which the shortest distances between the lenses and the object are the same. In other words, the measurement matrix may refer to a measurement matrix on a flat plane that is perpendicular to a straight line drawn from a lens located at a vertex of the curved surface.

As a result, it may be understood that when a signal by an image exists at any one point, the signal is input through more lenses 2. The measurement matrix for a flat plane in various straight distances between lenses and an object may be obtained by repeatedly performing such a method.

Hereinafter, a process of recovering an image using the measurement matrix will be described.

First, the measurement matrix obtained through the above process may be stored in the measurement matrix storage unit 20 according to each distance. The image recovery unit 30 may recover an image by using the detected image 4 in which a quantity of light input through each compound eye 10 is implemented and the measurement matrix stored in the measurement matrix storage unit 20.

Pixels corresponding to the number of the lenses 2 may be provided in the detected image 4, and a measurement matrix corresponding to a distance between the lenses 2 and the object may be loaded from the measurement matrix storage unit 20. The distance between the lenses and the object may be measured by using a separate distance measuring sensor, and after an image is recovered using a plurality of measurement matrixes, a measurement matrix, which has recovered an optimal image, may be selected as a preferred matrix.

When y denotes information on a light quantity of a pixel in the detected image 4, which may correspond to the viewing areas of the lenses 2, A denotes the measurement matrix, and x denotes information on a light quantity of a pixel in the recovered image 5, a relationship of Equation (1) is established.

$$y = Ax \\ = A\Psi s \qquad (1)$$

Here, $$y \in \mathbb{R}^{M \times 1}$$

-continued $$x \in \mathbb{R}^{N \times 1}$$

$$A \in \mathbb{R}^{M \times N}$$

$$\Psi \in \mathbb{R}^{N \times N}$$

Here, N denotes the number of pixels of the recovered image 5, M denotes the number of pixels of the detected image 4, A denotes the measurement matrix, Ψ may be provided as a sparsifying basis by which the information x on the light quantity is estimated to have a small number of nonzero elements s. $a_{ij}$, which is an arbitrary element of the measurement matrix A, indicates that a light quantity of a $j^{th}$-recovered pixel is affected by a viewing area of a $i^{th}$ lens. For example, it can be considered that when $a_{ij}$ is zero, a pixel of a $j^{th}$-recovered image exists outside a viewing area 6 of the $i^{th}$ lens, when $a_{ij}$ is one, the pixel of the $j^{th}$-recovered image exists inside the viewing area 6 of the $i^{th}$ lens, and when $a_{ij}$ is larger than zero and is smaller than one, the pixel of the $j^{th}$-recovered image exists in a boundary of the viewing area 6 of the $i^{th}$ lens.

Meanwhile, Equation (1) is an underdetermined system given as N>M. In order to find a solution of the underdetermined system through an optimization process, first, an image may be expressed as a sparse signal, and second, it is necessary that the measurement matrixes are provided to be incoherent from each other. However, it has been known that an image of the nature world is expressed as a sparse signal in a wavelet domain or a domain such as a discrete cosine transform and a discrete Fourier transform. Thus, the first condition is satisfied. Second, in the measurement matrix, since a viewing area of any lens applies information only to a specific pixel of the recovered image, the viewing area is incoherent to the entire pixels. Thus, the second condition is satisfied.

Accordingly, in the embodiment, compressive sensing using sparse representation is used to find a solution of Equation (1). In the embodiment, this is one feature.

x of Equation (1) may be solved by a linear equation of Equation (2).

$$\hat{s} = \underset{s}{\operatorname{argmin}} \|S\|_1 \text{ subject to } \|y - A\Psi s\|_2^2 \leq \varepsilon \quad (2)$$

$\| \|_1$ denotes a L1 norm, and denotes a threshold that may be set, modified, or selected in advance.

In the embodiment, Equation (2) is solved using the alternating direction method. The alternating direction method may refer to Yang, J. & Zhang, Y. Alternating direction algorithms for l1-problems in compressive sensing. SIAM J. Sci. Comput. 33, 250-278 (2011). In addition, an optimum solution may be found using the simplex method, the steepest decent method, or the second derivative method. As yet another example, the optimum solution may be found using a L1 norm optimization method which has been proposed in Korean Patent No. 10-1423964 by the applicant of the present disclosure.

When the small number of nonzero elements s are found using the L1 norm optimization method, the information x on the light quantity in the recovered image may be obtained using Equation (3).

$$\hat{x} = \Psi \hat{s} \quad (3)$$

In Equation (3), $\hat{x}$ may be considered as the information x on the light quantity of the pixel in the recovered image.

When a first experiment according to the embodiment is performed, a simulation is performed in a state in which N, which is given as the number of the pixels, is 25600 given as 160×160 and corresponds to two-dimensional pixels, M, which is given as the lenses 2 and the photosensors 3, is 6400 given as 80×80 and is arranged in a spherical surface, the angle 11 between the lenses is 2.25 degrees, and the shortest distance between the lenses 2 and the object is 10 mm.

Figure 11:
FIG. 11 is a view illustrating a result obtained by acquiring a detected image without digital signal processing while the acceptance angle is 2.25 degrees, which is equal to the angle between lenses, according to the related art, and FIG.
Figure 11:
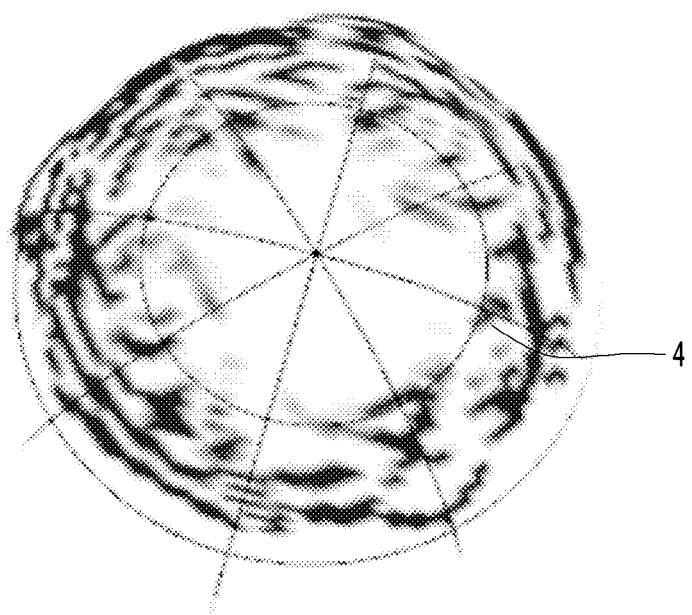
Figure 12:
Figure 12:
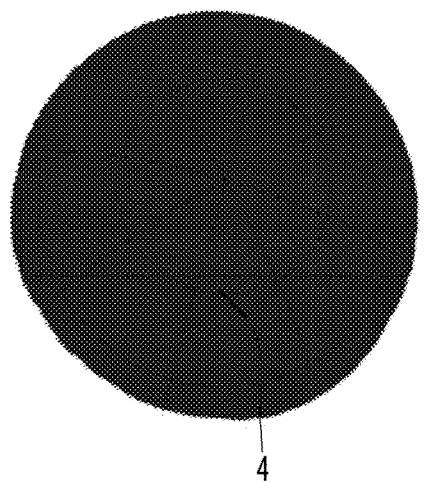
Figure 12:
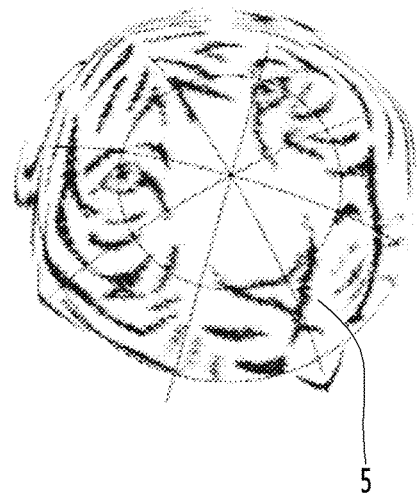

FIG. 11 is a view illustrating a result obtained by acquiring a detected image without compressive sensing while the acceptance angle is 2.25 degrees, which is equal to the angle between lenses, according to the related art, and FIG. 12 is a view illustrating a recovered image obtained by performing the compressive sensing while the acceptance angle is 60 degrees, which is approximately 27 times larger than the angle between lenses, according to the embodiments.

Referring to FIG. 11, in the related art, since the detected image 4 is blurry, it is difficult to identify whether the detected image 4 is a tiger or not. Referring to 12, the detected image 4 may not be identified at all. This is because the acceptance angle of the lenses 2 is wide, and thus a large quantity of light is input through the lenses. However, it can be identified that an image having an improved resolution may be recovered through the recovered image 5 recovered using the compressive sensing using sparse representation using the measurement matrix and the detected image.

When a second experiment according to the embodiment is performed, a simulation is performed in a state in which N, which is given as the number of the pixels, is 25600 given as 160×160 and corresponds to two-dimensional pixels, M, which is given as the lenses 2 and the photosensors 3, is 10000 given as 100×100 and is arranged in a spherical surface, the angle 11 between the lenses is 1.8 degrees, the acceptance angle is 60 degrees, and the shortest distances between the lenses 2 and the object are 5 mm, 10 mm, and 15 mm. At this time, the measurement matrixes are obtained according to the shortest distance between the lenses and the object, and all the obtained measurement matrixes are input to the measurement matrix storage unit 20, and are used.

Figure 13:
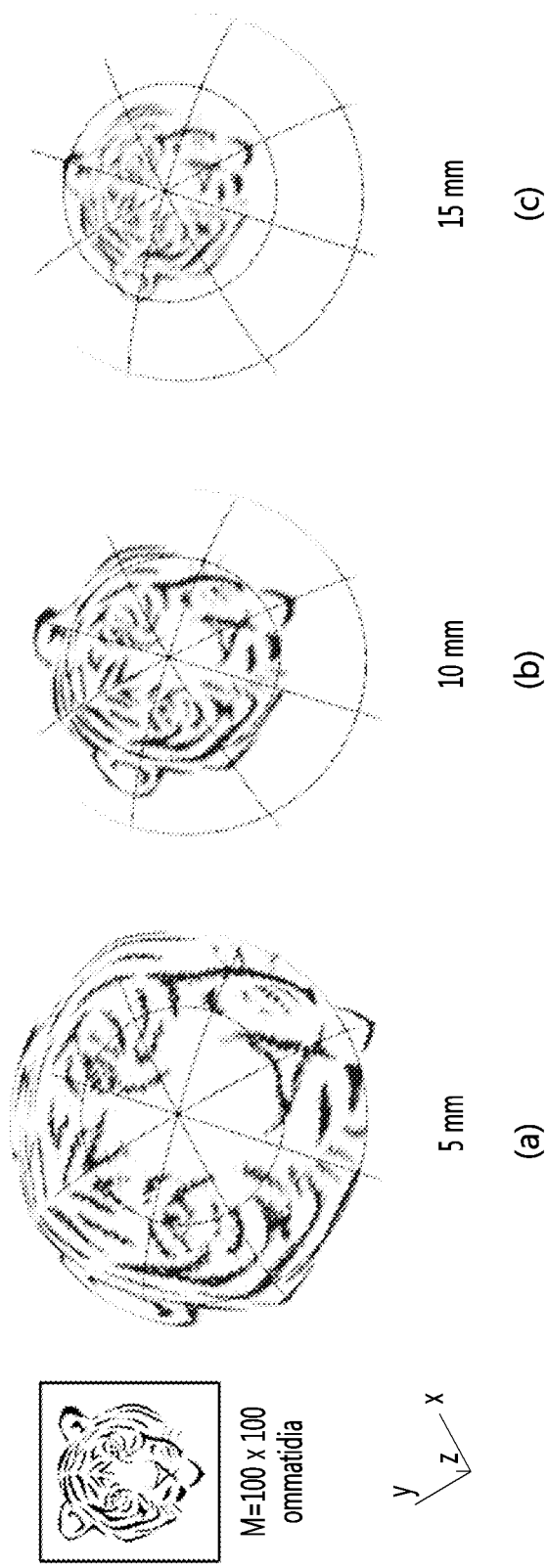
FIG. 13 is a view illustrating an experimental result of an experiment of recovering an image according to various distances.

FIG. 13 is a view illustrating an experimental result of the second experiment, and it can be identified that in any cases, an image can be recovered accurately.

In the above-described experiments, although the experiments have been performed using several thousands of lenses, the same effect may be obtained through several tens of lenses. For example, the same effect may be obtained even using eight image sensors.

Another embodiment of the present disclosure will be introduced. First, although it is described in the embodiment that the lenses are arranged on the curved surface, the present disclosure is not limited thereto. For example, the embodiment of the present disclosure has no problem even when the lenses are arranged on a flat plane. However, it is preferable that the lenses be arranged on the curved surface to obtain an image having a wide range, for example, 180 degrees or more.

INDUSTRIAL AVAILABILITY

According to the present disclosure, the resolution of an image may be improved even while a wide undistorted FOV, an infinite depth, and fast motion recognition, which may be obtained using compound eyes, are used. Accordingly, discrimination of an object by the compound eyes may be improved, so that a human having camera-type eyes may acquire image information while advantages of the compound eyes are maximized.

Accordingly, usage advantages, which may be widely utilized for a monitoring field, a motion detecting field, and the like, are greatly expected.

The invention claimed is:

1. An imaging device using a plurality of lenses, the imaging device comprising:
   at least several tens of lenses arranged such that an angle between the lenses is smaller than an acceptance angle of the lenses;
   at least several tens of photosensors configured to measure a quantity of light input to correspond to the several tens of lenses, a single photosensor of the at least several tens of photosensors corresponding to a single lens of the at least several tens of lenses,
   wherein the single photosensor of the at least several tens of photosensors corresponds to a single pixel of a detected image;
   a measurement matrix storage unit in which at least one measurement matrix is stored; and
   an image recovery unit configured to acquire a recovered image from the detected image by using an equation, $$\hat{s} = \underset{s}{\mathrm{argmin}} \|S\|_1 \quad \text{subject to} \quad \|y - A\Psi s\|_2^2 \leq \varepsilon$$

wherein y denotes information on pixels measured by the at least several tens of photosensors, A denotes the measurement matrix, x denotes information on pixels of the recovered image, $x = \Psi s$ is satisfied when x denotes information on the pixels of the recovered image, is a sparsifying basis by which the information x on a light quantity of a pixel of the recovered image is estimated to have a small number of nonzero elements s, and c is a threshold.

2. The imaging device of claim 1, wherein an acceptance angle of the lenses is several tens times larger than an angle between the lenses.

3. The imaging device of claim 1, wherein the measurement matrix is a measurement matrix for a point on a flat plane at which the shortest distances between the lenses and an object are the same.

* * * * *